April 27, 1965          G. BUHMANN          3,180,910
METHOD AND APPARATUS FOR MAKING COAXIAL CABLES
Filed May 22, 1961          2 Sheets-Sheet 1
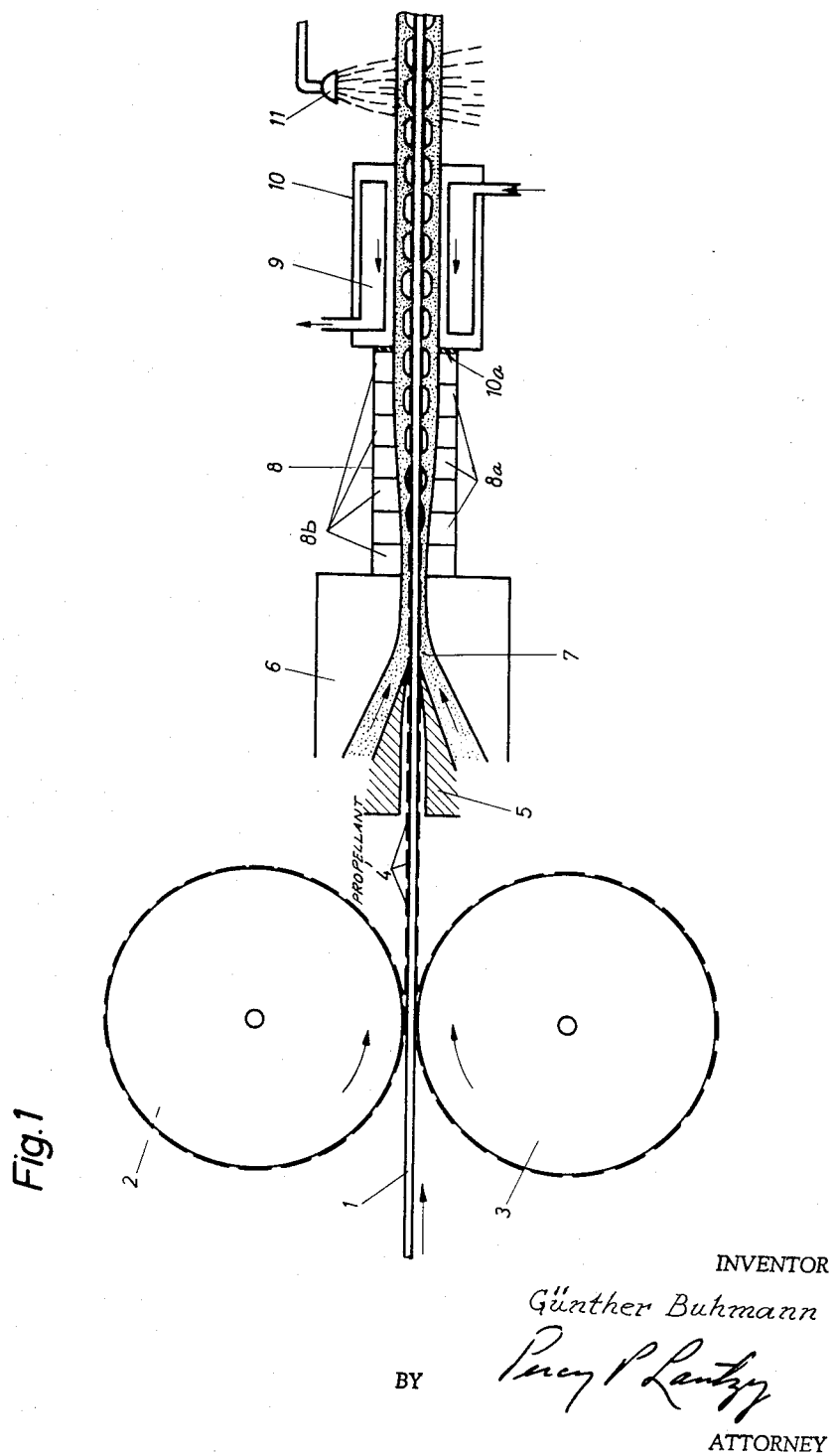
INVENTOR
Günther Buhmann
BY
ATTORNEY

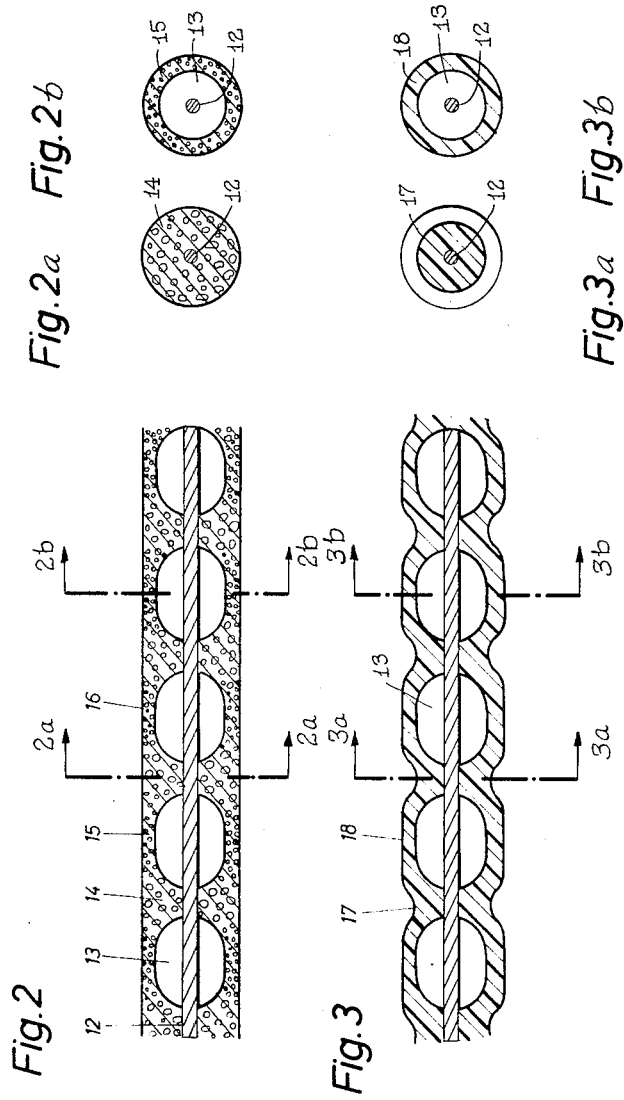

3,180,910
METHOD AND APPARATUS FOR MAKING COAXIAL CABLES
Günther Buhmann, Ludwigsburg, Germany, assignor to International Standard Electric Corporation, New York, N.Y., a corporation of Delaware
Filed May 22, 1961, Ser. No. 125,302
Claims priority, application Germany, May 25, 1960, 16,518
14 Claims. (Cl. 264—96)

This invention relates to the method and apparatus for the manufacture of cavity insulated electrical conductors and more particularly to such conductors wherein the cavity is formed by the gasification of a propelling agent placed between the conductor and the outer sheathing.

The dielectric constant of cables can be considerably increased through the use of gas space insulation, since gases in their normal state have a high dielectric constant. In air space cables, for instance those of the coaxial type, the inner conductor is held in place by spacing means placed within the outer conductor. The spacing means are embodied as perforated disks, thread suspensions, web-shaped forms, indentations of the insulating sheath, windings of the insulated sheath arranged to create a space between the sheath and the inner conductor, or similar devices. The inner conductor supports can also be used for conductors having gas space insulations that are not of coaxial design. However, considerable machinery is required for the manufacture of such conductors and the speed with which they can be manufactured is relatively low.

The most suitable dielectrics for cavity insulated cables are thermoplastic materials that can be easily applied in a plastics extruder. Among such thermoplastic materials are polyethylene and its derivatives which are much used due to their desirable electrical properties. The use of plastic foam for an insulating layer immediately in contact with a wire conductor is also known to keep the dielectric constant of low-loss conductors at high values.

The ordinary designs of coaxial and other high frequency cables usually require special machinery in their formation, which machinery is incapable of high-speed operation. Where high frequency cables having electrical properties of commercial quality are to be manufactured in large quantities, and where such cables must be particularly suited to compete with the widely used paper insulated cables, attainment of high production speed and low machinery investment in producing such cables becomes a decisive factor.

It is therefore, an object of this invention to provide a method for manufacturing a cavity insulated electrical conductor that not only has very low transmission loss but can also be manufactured in a simple operation at high extruison speed.

A further object is to provide apparatus to be used in conjunction with an insulation application device to produce gas space insulation.

To summarize the present invention, in one aspect it consists in the apparatus and method of manufacturing a cavity insulated electrical cable wherein a conductor is coated with a propellant prior to application of a deformable insulation. The propellant is of such nature that as the deformable insulation, for instance a hot plastic sheath, then applied over the conductor and the propellant adhering thereto, the propellant vaporizes and expands, driving the insulating sheath away from the conductor over the coated portions and in this way forming cavities conforming to the pattern in which the propellant was deposited on the conductor. Another aspect consists in the production of cavities in the insulating sheath itself by mixing foaming agents in the plastic to be extruded onto the conductor. Other aspects include outside diameter control of the cable, temperature control of the sheath during vaporization of the propellant, and cooling of the expanded cable.

The above-mentioned and other features and objects of this invention and the manner of attaining them will become more apparent by reference to the description taken in conjunction with the accompanying drawings in which:

FIG. 1 is a schematic view of the arrangement of apparatus for practicing the method of this invention;

FIG. 2 is a longitudinal sectional view through a cable formed by the method of this invention; and FIGS. 2a and 2b are transverse cross-sectional views through the cable of FIGURE 2 along the lines 2a and 2b respectively;

FIG. 3 is a longitudinal sectional view of an alternate embodiment of the cable formed by the method of this invention;

FIGS. 3a and 3b are transverse cross-sectional views through the cable of FIGURE 3 along the lines 3a and 3b respectively.

The term "propellant" as used herein described a material which has the nature of vaporizing or decomposing into a gaseous form when heated. The propellant may also be embodied as a material which is capable of absorbing gases and of releasing the absorbed gases upon the application of heat. Thus, the assential feature of the propellant is that it gasifies under thermal excitation. Preferably, the gaseous form does not condense when cooled; that is, the gas does not return to a liquid or solid form on cooling. Rather, it remains in the gaseous form but at a lower degree of excitation and therefore at a lower vapor pressure, exerting less pressure on the insulating sheath than when heated. The term "propellant" therefore includes, but is not limited to, foaming agents as are known in the foamed plastics arts. The term "blowing agent" is also known in the art as being descriptive of one of the types of material which is herein referred to as a "propellant." A blowing agent, or propellant, is a substance which decomposes, vaporizes, or otherwise gasifies to form a gas at a temperature below the gel temperature of a plastic with which it is being used. Examples of propellants, given by way of illustration and not limitation, are dinitroso compounds, such as dinitroso pentamethylene tetramine, and hydrazides, such as, benzene sulfonyl hydrazide, all of which evolve nitrogen. Inorganic agents, such as bicarbonates which evolve carbon dioxide, may also be used.

The apparatus shown in FIG. 1 provides for the formation of insulating cavities surrounding a conductor and formed by forces springing from the surface of the conductor. By utilizing the method of the present invention a bar conductor can be processed into a cavity insulated cable. Also, any type of conductor or wave-guide may be electrically insulated in accordance with the method of this invention. Further any object may be thermally or electrically insulated by using the method of this invention, the apparatus being adapted as necessary. My invention provides insulating cavities around the conductors so sheathed which cavities are formed by forces arising between selected areas of the wire conductor surface and the insulating material. To achieve this result the conductor before entering an extruder is adhesively coated with a liquid or solid propellant that partially or totally converts to the gaseous phase when heated, thereby inflating the insulating layer and forming cavities at the places coated with the propellant. The heat used to soften the thermoplastic material of the sheathing is usually sufficient to convert the propellant to the gaseous phase. Where the heat from the plastic coating is not sufficient to cause the propellant to convert to a gaseous phase, additional heat may be supplied immediately following the extruder. A heating tube may be used which will serve, not only to heat the cable, but also to calibrate the thickness of the insulation as the cable passes through the tube by limiting the cable outside diameter to the inside diameter of the tube. The heated tube is located preferably at the outlet nozzle of the extruder and maintains the application of the heat to the cable or wire for a short period of time until the cavities are fully inflated. The cable is then cooled to harden the plastic. While rapid cooling of the finished conductor is not absolutely necessary the practical advantages of cooling are realized where run-out space for ambient cooling of the cable is limited or when a quick setting of the cavities that have formed is desired.

FIG. 1 is a schematic view of the arrangement of the apparatus for practicing the method of my invention. A conductor 1 enters the apparatus and passes between rotating rollers 2 and 3 in the direction of the arrow. Rotating rollers 2 and 3 apply propellant 4 to the surface of the conductor. The conductor with propellant 4 applied passes into a conductor guide 5 where it is centered before passing into an extruder 6 where a plastic insulation is applied commencing at sheathing point 7. The sheathed conductor passes into calibration tube 8 which may consist of heating zones 8a and cooling zones 8b as further described below.

While passing through the heated calibration tube, the outside diameter of the sheathed conductor expands due to the expansion forces arising from the gasification of the propellant. The expanded, sheathed conductor then passes into a cooling channel 10 which is arranged to be cooled by a fluid 9 flowing therethrough. The cooling channel 10 is separated from the calibration tube 8 by an insulation layer 10a which may be an asbestos ring. Upon emerging from the cooling channel 10 the partly cooled, expanded, sheathed conductor passes through a second cooling stage which may be, for instance, a cooling water spray bath 11.

The conductor 1 has been described as a bare wire. The conductor may alternatively consist of a wire having an insulating or protecting sheath as, for example, a varnished wire or a wire bearing a polymeric plastic sheath. The conductor may also have a sheath consisting of a plurality of mutually insulated conductive layers.

The propellant application rollers 2 and 3 may be any well known print-on device which is used for marking cables, conductors or wire, for instance, those devices used to apply contrasting dyes to the surface of cables and conductors, the dyes being in a semi-fluid, pasty or powdery state. The most suitable among such devices are those that are adapted to apply dyes to limited and annularly closed surface areas.

The propellant, with adhesive additives if necessary, takes the place of the dye and is applied to the surfaces. The propellant can be applied in the form of rings completely encircling the conductor and spaced apart at distances determined for suitable support of the insulation by the conductor after the cavities have been formed. The support walls, may be 5 to 30% of the length of the propellant ring.

The propellant may alternatively be applied in a spiral around the conductor. In such case the propellant is applied by means of a rotating dispenser in the form of circumference-printing rollers. As another alternate the propellant dispenser may take the form of a ring and remain stationary, the marking being done by passing the wire through this ring while swinging the wire in a circle around the axis of the ring, thereby picking up the propellant itself from the ring and forming a spiral pattern deposit.

As shown in FIG. 1 the marking arrangement for applying the propellant to the wire consists of two rollers 2 and 3 which touch the wire from two opposite sides. By means of a groove adapted to the conductor diameter each envelops one-half of the circumference while rotating at a peripheral speed equal to the drawing speed of the conductor. Means, not shown, are provided for applying the propellant to the circumference of the two rollers. For that purpose application devices, such as brushes, other rollers or the like may be used. Just as with the print-on method the propellant applied to the surface of the wheel is rolled onto the wire surface continually and adheres to the surface areas to be covered. Alternatively, three wheels may be used having wheel planes turned 120 degrees with respect to one another, each of which prints or sprays in synchronism one-third of the circumference.

The conductor guide 5 centers the conductor for entry into the extruder 6. The conductor guide is, in most instances, tubular in design and forms a part of extruder 6. In the usual case of commercially produced wire a conductor is plastic coated in a plastics extruder of a type generally known and available in the cable arts. The extruders are capable of high operating speed and apply the plastic insulation by flowing the plastic directly onto the surface of the wire at the extrusion point of the extruder. As the hot plastic insulation is extruded onto the conductor, the propellant reacts to the heat and starts to decompose into gas, thus inflating the insulating layer which was extruded over the conductor. Depending on the drawing speed of the conductor, the pressure and temperature of the plastic, the pressure exerted in the pressure channel, and the type of propellant, the inflation of the insulating sheath through gas formation of the propellant occurs more or less rapidly.

The heated calibration tube is constructed so that it increases in internal diameter in the direction of cable travel in accordance with the predetermined desired increase in the diameter of the conductor. When the desired cross-section of the cable has formed, further expansion is limited by the calibration tube 8. The cable, which at this point is still at high temperature and very soft, must be cooled to maintain its shape. The cooling can be done practically in cooling channel 10, the bore of which is also equal to the desired outside diameter of the cable and which limits the further expansion of the conductor diameter during cooling. For complete cooling the cable can then be run through a cooling water bath 11.

In order to prevent the partial collapse of the expanding cavities of the conductor during the passage through the calibrating tube 8 and cooling channel 10, and to obtain the desired formation of cavities at the proper heat application, appropriate heat adjustment must be provided from sheathing point 7 onward through tube 8 and channel 10. To that end, it is advisable to divide the calibrating tube into relatively narrow heating zones 8a and cooling zones 8b, each zone being individually adjustable in temperature and surrounding the channel annularly.

The plastic flowing into sheathing point 7 is so guided due to the design of the extruder that the radial pressure exerted on the conductor by the flowing plastic is evenly distributed over the circumference of the conductor. Thus, the conductor is pushed evenly against the conductor guide 5 eliminating the danger of wiping off or smearing the propellant areas and thereby losing the desired sharp demarcation between the sprayed and unsprayed areas. The usual plastics extruder meets the requirement for even flow pressure of the plastic in that the flow of plastic completely surrounds the conductor well before it reaches the sheathing point 7, and thus the speed of flow and the extrusion pressure at point 7 on the moving conductor are even on all sides. Alternately, the wire can be centered by the conductor guide 5 shortly before the extrusion point 7 by limiting the centering contact between the wire guide and the conductor to three or four individual point-shaped locations evenly distributed over the circumference. The propellant applied to the conductor will not then be wiped off to any significant degree.

FIGS. 2 and 3 are cross-sectional views of cables produced by the method and apparatus of this invention. FIGURE 2 shows a finished cable with annular cavities, cylindrical external surface and foamlike wall of the insulating sheath. The insulation is held in spaced relation to the conductor by supports 14. The cavities 13 formed by the expansion of the propellant between the wire and sheath are shown in the shape of rings as may be seen in the cross-sectional view at 2b. FIG. 2a is a cross-sectional view through the conductor support 14 and shows the conductor 12 in its tightly enclosed position.

Since according to the invention's method the plastic may be processed not only in the solid state but can also be mixed with liquid or powder propellants, the insulating sheath may be not only in solid form but may also be in a foamlike state. The foaming of the propellant present in the insulating composition itself is caused by the additive foaming agents. Thus, in accordance with FIG. 1 starting from extrusion point 7 and onward through the heating and calibrating tube 8 up to cooling channel 10, the choice of a solid or foamlike wall of the insulating sheath is independent of the formation of the cavities.

The simultaneous formation of cavities 13 and of the cells making up the foam leads to different size foam cells at the position of conductor supports 14 and in wall 15 due to the pressure they exert on each other during formation. Although the foam cells in wall 15 are somewhat smaller than those at the position of the conductor support 14, the external diameter 16 is constant and the electrical characteristics of the cable are not affected since the foam formation at 15 lies outside the high electrical field density surrounding the conductor.

The mechanically sturdy formation of sheath 15 is desired in the interest of relatively high resistance to compression. In the case of relatively thin cables of this type, which can advantageously replace paper-wound cable, there are fewer advantages in making the cable from foam material.

In the cable according to FIG. 2 the inflation of the ring-shaped cavities is delimited by calibration tube 8 so that the cable is cylindrical. In the cable according to FIG. 3, inflation of the cavities is given more leeway through corresponding diameter change in the calibration tube so that the inflated cavities are also identifiable on the outside of the cable. Thus, at 17 the cable has constrictions between the cavities, whereas the outside diameter of the cavities at 18 is larger but has to a certain degree been limited by cylindrical calibration. FIG. 3a is a section through the support at 17; the section 3b is a section through the cavity. An extension of the concept of FIG. 3 will consist in not calibrating the wire at all during cavity formation in which case a cable would result looking somewhat like a string of pearls. The cylindrical, or substantially cylindrical, shape of such cables, however, reduces the danger of uncontrollable shifts in position of the stranded conductors in the cable and of my coupling difficulties therefrom.

While I have described the principles of my invention in relation to specific embodiments thereof it should be readily apparent that many variations may be made without departing from the teachings thereof. For example, it would be possible to apply a propellant to the external surfaces of the material, such as the outside of a waveguide, which is not susceptible of passage through an extrusion press. The plastic material could then be applied over the propellant by spraying or gluing in layers. Heat could then be applied causing the insulation to expand forming insulating cavities around the waveguide. Accordingly, while I have described my invention with reference to specific embodiments, it is to be understood that the invention is to be interpreted by the state of the prior art and the appended claims.

I claim:

1. Apparatus for manufacturing a cavity insulating electric cable comprising: means to apply a propellant to an electrical conductor, means to apply a molten thermoplastic sheath over the assembly of said conductor and said propellant whereby the heat of said molten sheath thermally excites said propellant causing it to gasify and force said insulation apart creating cavities between said conductor and said insulation, means to control the external diameter of said expanded thermoplastic insulation, and means for conveying said conductor from said applying means to said controlling means.

2. Apparatus as in claim 1 further comprising a cooling channel to solidify the thermoplastic material.

3. Apparatus for manufacturing a cavity insulated electric cable comprising means to apply a propellant to an electrical conductor, a plastics extruder to apply a thermoplastic insulating cover over the assembly of said conductor and said propellant, a calibration tube, means for conveying the assembly of said conductor, propellant, and insulating cover through said calibration tube wherein the external diameter of said thermoplastic cover is limited to the maximum internal diameter of said calibration tube under the expanding force of the propellant, a cooling chamber, and means for conveying said conductor from said calibration tube through said cooling chamber to solidify the thermoplastic insulating cover.

4. Apparatus as in claim 3 wherein the internal diameter of said calibration tube is conical, increasing in size in the direction of travel of said conductor through said tube.

5. Apparatus as in claim 3 wherein said calibration tube contains means to heat said thermoplastic cover as said thermoplastic cover expands to the limiting shape of the calibration tube.

6. Apparatus as in claim 5 wherein said calibration tube further contains cooling means alternated with said heating means to control the temperature of said thermoplastic cover as it passes through said calibration tube.

7. Apparatus as in claim 3 further comprising a cooling water bath after said cooling chamber to further reduce the temperature of said cable.

8. Apparatus as in claim 3 wherein said means to apply a propellant to an electrical conductor comprises two application rollers mounted adjacent to said conductor, means for conveying said conductor between said application rollers, and means causing said rollers to rotate in opposite directions each having a peripheral motion in the direction of travel of said conductor.

9. Apparatus as in claim 8 wherein said application rollers are arranged to apply said propellant to selected portions of said conductor.

10. The method of manufacturing cavity insulated electric cables comprising the steps of applying a propellant to selected portions of a conductor, extruding a hot insulating sheath over said conductor and said propellant, whereby said propellant gasifies through thermal action and inflates the insulating sheath over the selected surface portions to which the propellant was applied thus creating cavities between said conductor and said insulating sheath.

11. A method according to claim 10 further comprising heating said sheathed conductor whereby additional heat for gasification of the propellant is supplied.

12. A method according to claim 10 further comprising cooling the sheathed conductor whereby the plasticity of said sheath is controlled.

13. A method according to claim 10 further comprising controlling the external diameter of said expanded cable.

14. The method of manufacturing a cavity insulated electrical cable comprising the steps of applying a propellant to selected portions of a conductor, mixing propellant with a thermoplastic material, extruding said mixture of thermoplastic material and propellant over said conductor and said propellant applied to said conductor at a temperature below that at which said propellant will gasify, heating said conductor whereby said propellant gasifies to form gas bubbles in said thermoplastic material and to form cavities between said selected portions of said conductors and said thermoplastic material, controlling the external diameter of said conductor, and cooling said conductor whereby said thermoplastic material solidifies.

References Cited by the Examiner
UNITED STATES PATENTS

| | | | |
|---|---|---|---|
| 2,288,899 | 7/42 | Gits | 18—59 |
| 2,288,900 | 7/42 | Gits | 174—28 |
| 2,454,800 | 11/48 | Hartstein et al. | 174—28 |
| 2,471,752 | 5/49 | Ingmanson | 18—13 |
| 2,518,454 | 8/50 | Elliott | 264—47 |
| 2,579,044 | 12/51 | Kober | 117—15 |
| 2,581,769 | 1/52 | Olson | 18—13 |
| 2,708,176 | 5/55 | Rhodes | 174—28 |
| 2,760,228 | 8/56 | Vergas | 18—13 |
| 2,766,479 | 10/56 | Henning | 18—13 |
| 2,862,284 | 12/58 | Wiczer | 264—47 |
| 2,897,542 | 8/59 | Isenberg | 18—13 |
| 2,948,020 | 8/60 | D'Ascoli | 18—59 |
| 2,973,552 | 3/61 | Downing et al. | 18—13 |

ALEXANDER H. BRODMERKEL, *Primary Examiner.*
BENNETT G. MILLER, MICHAEL V. BRINDISI,
*Examiners.*